(12) United States Patent
Thumar et al.

(10) Patent No.: US 12,707,252 B2
(45) Date of Patent: Aug. 11, 2026

(54) AUTONOMIC NETWORK RECOVERY OF DEVICES USING MACHINE LEARNING TECHNIQUES

(71) Applicant: T-Mobile USA, Inc., Bellevue, WA (US)

(72) Inventors: Satish Gobarbhai Thumar, Overland Park, KS (US); Deveshkumar Narendrapratap Rai, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 348 days.

(21) Appl. No.: 18/589,064

(22) Filed: Feb. 27, 2024

(65) Prior Publication Data

US 2025/0274740 A1 Aug. 28, 2025

(51) Int. Cl.
*H04W 8/20* (2009.01)

(52) U.S. Cl.
CPC .................................. *H04W 8/205* (2013.01)

(58) Field of Classification Search
CPC .................................................... H04W 8/205
USPC ........................................................ 455/418
See application file for complete search history.

(56) References Cited

U.S. PATENT DOCUMENTS 7,127,617 B2 10/2006 Wiederin et al.
7,317,699 B2 1/2008 Godfrey et al.
8,019,863 B2 9/2011 Jeide et al.
8,036,600 B2 10/2011 Garrett et al.
8,244,236 B2 8/2012 Roumeliotis et al.
8,577,358 B2 11/2013 Wesby
8,972,569 B1 3/2015 D'esposito
9,584,366 B2 2/2017 Godfrey et al.
9,585,033 B2 2/2017 Ding et al.
9,665,991 B2 5/2017 Simanek et al.
9,866,646 B2 1/2018 Chandhok et al.
10,068,494 B2 9/2018 Ahmad et al.
10,353,898 B2 7/2019 Kawecki
10,595,191 B1 3/2020 Mueller
10,878,497 B2 12/2020 Painter et al.
11,170,662 B2 11/2021 Ahmad et al.
11,393,348 B1 7/2022 Chartier et al.
11,424,993 B1 8/2022 Chaoji et al.
11,425,554 B2 8/2022 Herbert et al.
(Continued)

FOREIGN PATENT DOCUMENTS

CN 104521280 B 5/2019
CN 111295863 B 4/2022
(Continued)

*Primary Examiner* — Jirapon Tulop
(74) *Attorney, Agent, or Firm* — Ashurst Perkins Coie US LLP

(57) ABSTRACT

Systems and methods for autonomic network recovery of mobile devices are disclosed. The system receives an indication that a service network has not received a packet from a device in a threshold period of time and/or that packets received from the device are not interpretable. Responsive to receiving the indication, the system may obtain (1) device profile information of the mobile device and (2) one or more EDRs and input the obtained information and EDRs into a machine learning model to identify an instruction for reconfiguring the mobile device. The system can then transmit the instruction to a remote device for reconfiguring the mobile device.

20 Claims, 9 Drawing Sheets

(56) References Cited

U.S. PATENT DOCUMENTS

| | | | |
|---|---|---|---|
| 11,671,861 | B2 | 6/2023 | Malboubi et al. |
| 2008/0089302 | A1 | 4/2008 | Godfrey et al. |
| 2009/0204901 | A1 | 8/2009 | Dharmaji et al. |
| 2010/0041365 | A1 | 2/2010 | Lott et al. |
| 2012/0071131 | A1 | 3/2012 | Zisapel et al. |
| 2018/0204281 | A1 | 7/2018 | Painter et al. |
| 2019/0266622 | A1 | 8/2019 | Turnbull et al. |
| 2021/0141713 | A1 | 5/2021 | Poulin |
| 2021/0209249 | A1 | 7/2021 | Hoffer |
| 2021/0241912 | A1 | 8/2021 | Chazin et al. |
| 2022/0044320 | A1 | 2/2022 | Montgomery et al. |
| 2022/0174017 | A1 | 6/2022 | Nagarajan et al. |
| 2022/0292543 | A1 | 9/2022 | Henderson |
| 2022/0400367 | A1 | 12/2022 | Herbert et al. |
| 2024/0015499 | A1 * | 1/2024 | Nguyen ................ H04W 16/22 |

FOREIGN PATENT DOCUMENTS

| | | | | |
|---|---|---|---|---|
| EP | 2915053 | A2 | 9/2015 | |
| EP | 2949076 | A1 | 12/2015 | |
| EP | 3613176 | B1 * | 4/2023 | ............. H04L 45/22 |
| JP | 5882410 | B2 | 2/2016 | |
| KR | 102378846 | B1 | 3/2022 | |
| WO | 0179967 | A2 | 10/2001 | |
| WO | 2014071084 | A2 | 5/2014 | |
| WO | 2014116286 | A2 | 7/2014 | |
| WO | 2014116983 | A1 | 7/2014 | |
| WO | 2017093801 | A2 | 6/2017 | |
| WO | 2018136538 | A1 | 7/2018 | |

* cited by examiner

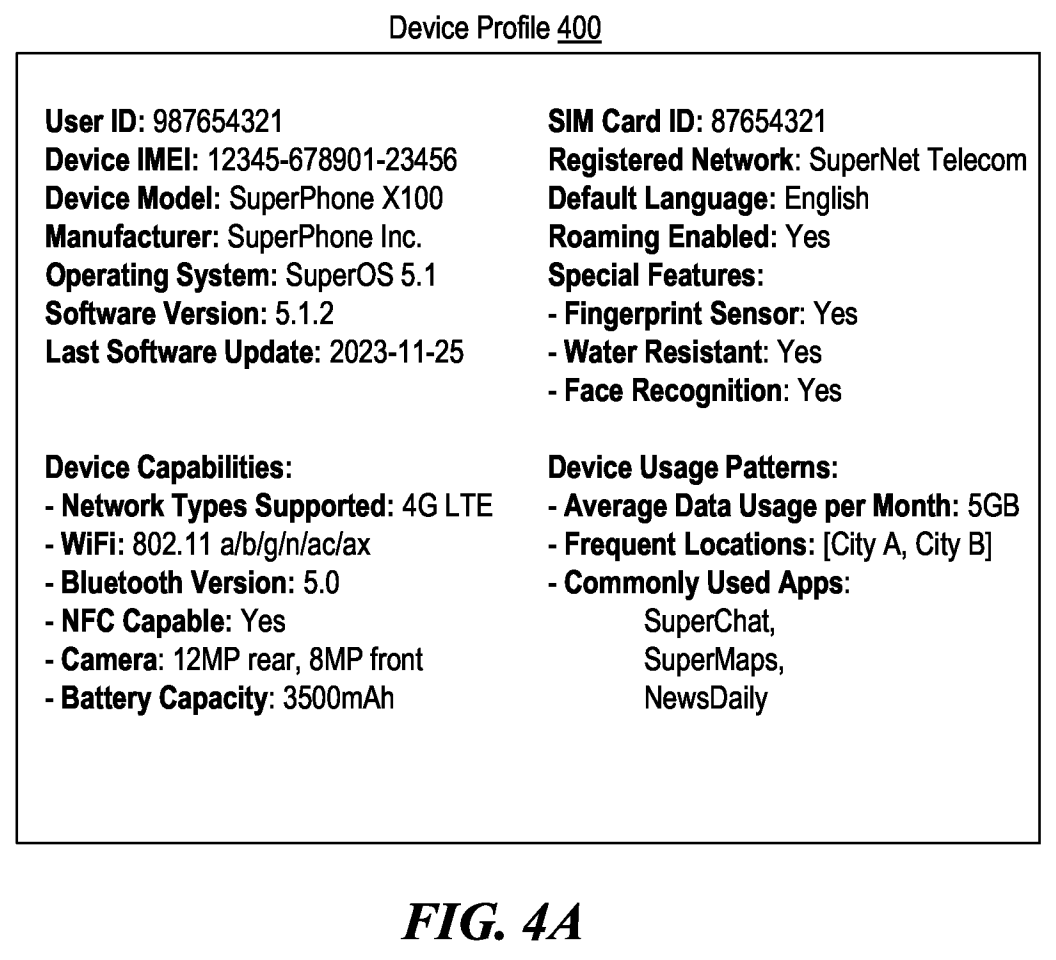

Device Profile 400

User ID: 987654321
Device IMEI: 12345-678901-23456
Device Model: SuperPhone X100
Manufacturer: SuperPhone Inc.
Operating System: SuperOS 5.1
Software Version: 5.1.2
Last Software Update: 2023-11-25

Device Capabilities:
- Network Types Supported: 4G LTE
- WiFi: 802.11 a/b/g/n/ac/ax
- Bluetooth Version: 5.0
- NFC Capable: Yes
- Camera: 12MP rear, 8MP front
- Battery Capacity: 3500mAh

SIM Card ID: 87654321
Registered Network: SuperNet Telecom
Default Language: English
Roaming Enabled: Yes
Special Features:
- Fingerprint Sensor: Yes
- Water Resistant: Yes
- Face Recognition: Yes

Device Usage Patterns:
- Average Data Usage per Month: 5GB
- Frequent Locations: [City A, City B]
- Commonly Used Apps:
  SuperChat,
  SuperMaps,
  NewsDaily

*FIG. 4A*

KPI Report 420

Date: 2023-12-01
Network ID: SuperNet123
Region: North Sector

| KPI | Value | Target | Status |
| --- | --- | --- | --- |
| Network Availability (%) | 99.8 | ≥ 99.5 | Good |
| Average Downlink Throughput (Mbps) | 50.2 | ≥ 45.0 | Good |
| Average Uplink Throughput (Mbps) | 25.3 | ≥ 20.0 | Good |
| Call Drop Rate (%) | 0.2 | ≤ 0.5 | Good |
| Data Session Drop Rate (%) | 0.3 | ≤ 0.5 | Good |
| Latency (ms) | 30 | ≤ 50 | Good |
| Signal Strength (dBm) – Average | -75 | ≥ -85 | Good |
| Customer Complaints Received | 20 | ≤ 25 | Good |
| Voice Quality Index | 4.5 | ≥ 4.0 | Good |
| Handover Success Rate (%) | 98.6 | ≥ 98.0 | Good |

*FIG. 4C*

AUTONOMIC NETWORK RECOVERY OF DEVICES USING MACHINE LEARNING TECHNIQUES

BACKGROUND

A telecommunications network is established via a complex arrangement and configuration of many cell sites that are deployed across a geographical area. For example, there can be different types of cell sites (e.g., macro cells, microcells, and so on) positioned in a specific geographical location, such as a city, neighborhood, and so on). These cell sites strive to provide adequate, reliable coverage for mobile devices (e.g., smart phones, tablets, and so on) via different frequency bands and radio networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5th generation (5G) with New Radio (NR), mobile communications network, 6th generation (6G), Open Radio Access Network (O-RAN), cloud, satellite communication, IEEE 802.11 (WiFi), or other communications networks. The devices can seek access to the telecommunications network for various services provided by the network, such as services that facilitate the transmission of various forms of data over the network and/or provide content to the devices.

Networks like these facilitate interconnectedness between devices so that services and applications that are hosted on servers can share data across devices. For many of these devices, new software and hardware updates, updates to spectrums and/or bands used, or other technology updates are deployed constantly. These new software and hardware updates generally enable devices to work more efficiently and effectively with more functionality. However, while updates provide for additional functionality, not every update is validated or robust from the hardware and software side, which means that each deployed update may not completely bug free or robust. Numerous updates can cause many unknowns in the network from the manufacturer of the device or from the software provider side of network connectivity, and this may lead to issues further down the line.

BRIEF DESCRIPTION OF THE DRAWINGS

Detailed descriptions of implementations of the present invention will be described and explained through the use of the accompanying drawings.

FIG. 4A is a block diagram illustrating an exemplary data structure of a device profile, in accordance with one or more implementations.

FIG. 4C is a block diagram illustrating an exemplary data structure of a key performance indicator report, in accordance with one or more implementations.

Figure 1:
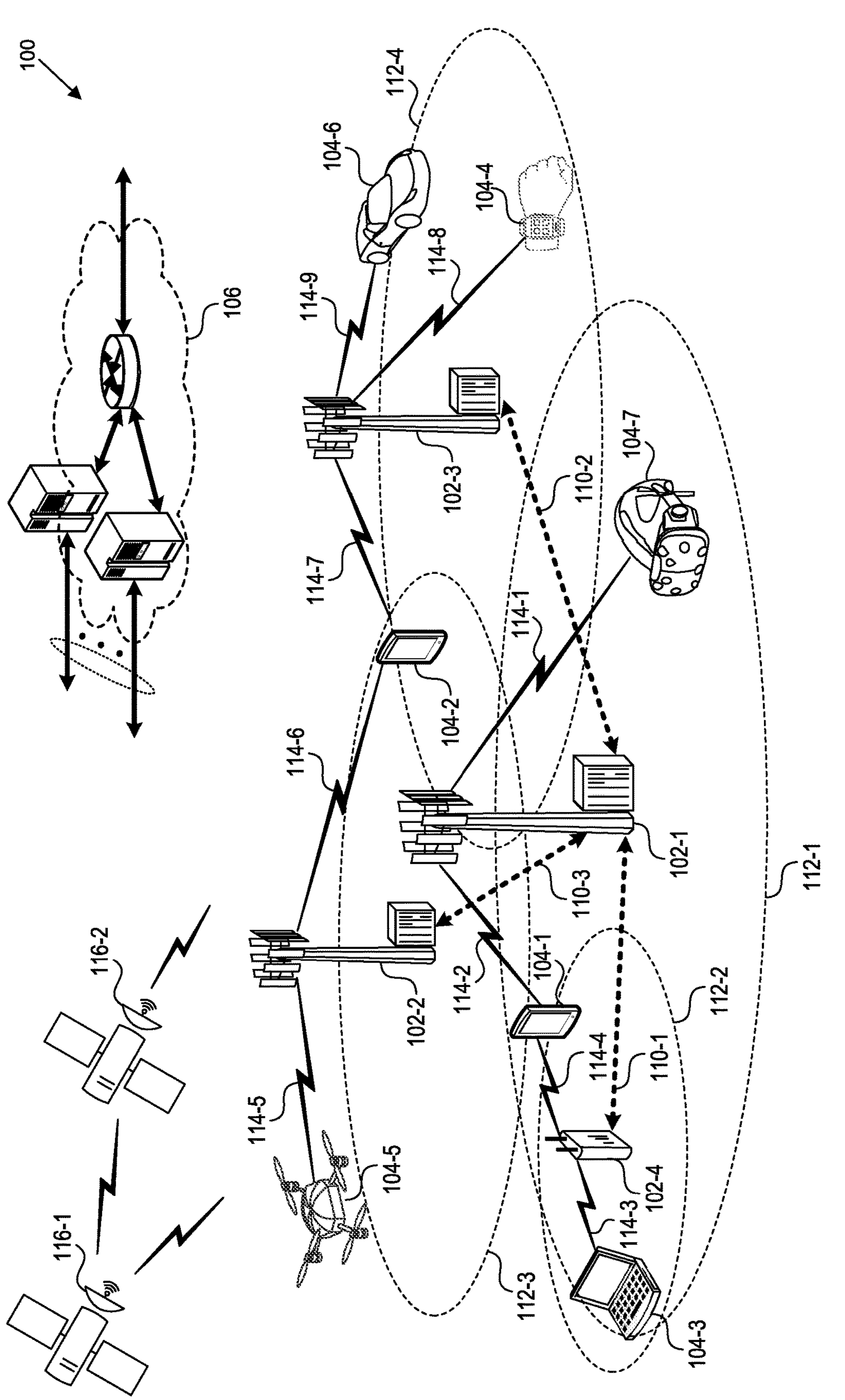
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Networks enable connectivity between devices, enabling them to access services and exchange data with servers. These devices and networks frequently receive software and hardware updates (e.g., devices may receive software updates, while networks may receive hardware updates) aimed at improving their performance and adding new features. Operators prioritize keeping hardware and software up-to-date through such updates because newer versions typically offer improved performance, efficiency, and better security against cyber threats. These updates often ensure compatibility with emerging technologies and enhance the user experience. Additionally, maintaining current systems reduces long-term maintenance challenges and costs, as older versions can become difficult and costly to support. Staying updated is not only beneficial for operational efficiency but also essential for regulatory compliance and meeting evolving user demands.

However, due to the sheer number of updates and the different variations of device hardware, software and network parameters, potential dissonance between components of the network may cause issues within the network infrastructure and environment. In particular, due to the many unknowns caused by consistent deployment of new software and hardware, it is difficult to facilitate cohesive connectivity throughout all components of the network. Often such frequent updates cause dissonance between the components of the network, causing messages (e.g., packets) to be corrupted, dropped, and/or otherwise unable to be interpreted by the network provider. Because mobile devices often get stuck from the network side, e.g., during the handshake process, and unable to communicate through the network in this way, service providers do not have any way to know the status and/or potential issues of such devices.

Accordingly, a mechanism is desired that would enable service providers (e.g., operators of the service providers) to be able to detect inconsistencies in the network and identify potential solutions so that the network can initiate communication with devices, e.g., devices that fail to communicate with the service provider effectively. To solve these problems, the inventors have conceived of and reduced to practice machine learning techniques to use data regarding the specific device and/or device type to learn behavior of the device and mitigate anomalies in network communication capabilities of devices, e.g., for example such that the network may take the necessary actions to recover communication, e.g., including alternate means of communication or attempting again to reach and instruct the device.

In particular, systems and methods disclosed herein enable a system to use inputs such as information provided in a device profile of the device, enhanced data records (EDRs), key performance indicators (KPIs), events at the device and/or network, performance measures that count numbers of different types of events at the device and/or network and/or the like into a machine learning model trained to identify potential fixes and/or identify a cause for the inability of a device to respond effectively, for example, because networks and device manufacturers generally have a preference to utilize newly enhanced technology to improve customer's experiences (e.g., where there is a mismatch between what device is sending and the network can comprehend). The system may transmit one or more instructions to remote devices in order to fix the problem. Instructions can include, for example, commands to automatically configure the mobile devices or commands to adjust parameters of a network node or to trigger some event based on preconfigured or communicated in the past command. In at least some implementations, the system operates independently of mobile devices and the network nodes over which the mobile devices communicate, enabling the system to detect and mitigate issues that are not visible to either the mobile devices or the network nodes. By doing so automatically, devices can experience consistent connectivity without downtime typically required to troubleshoot and reconnect devices by operators or users of the devices.

In one example, such systems are important in solving communication issues between devices and nodes where the device and node are not able to detect or solve these problems themselves based on the nature of their communication (e.g., hidden node problems). For example, hidden node problems occur when nodes in a network are out of range or obstructed. There may be sufficient data and an adequate model at the system that gives visibility into problems that are arising between a device and a node, such as the need to move closer to a node.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 provides communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
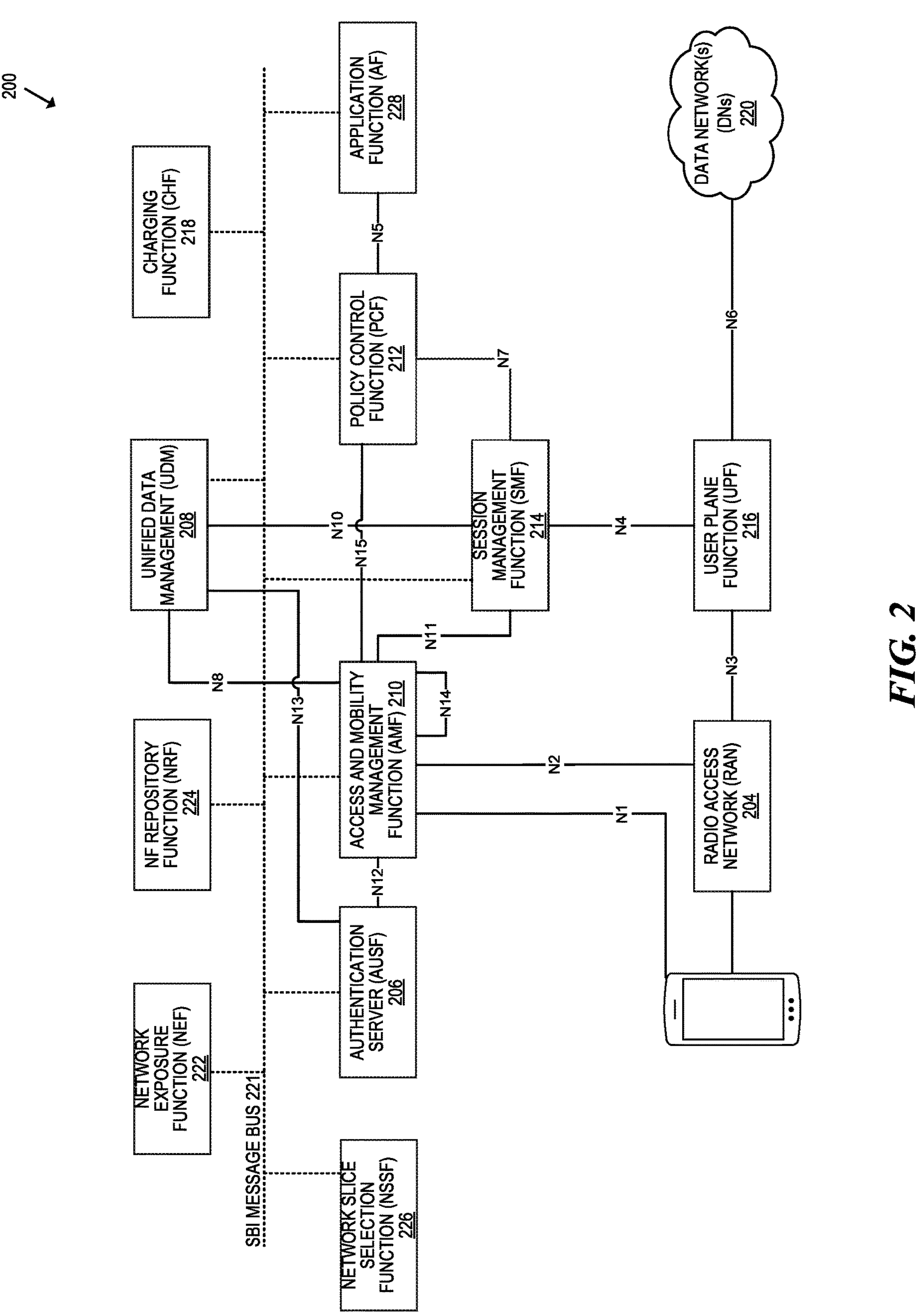
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them.

The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Suitable Computing Environments

Figure 3A:
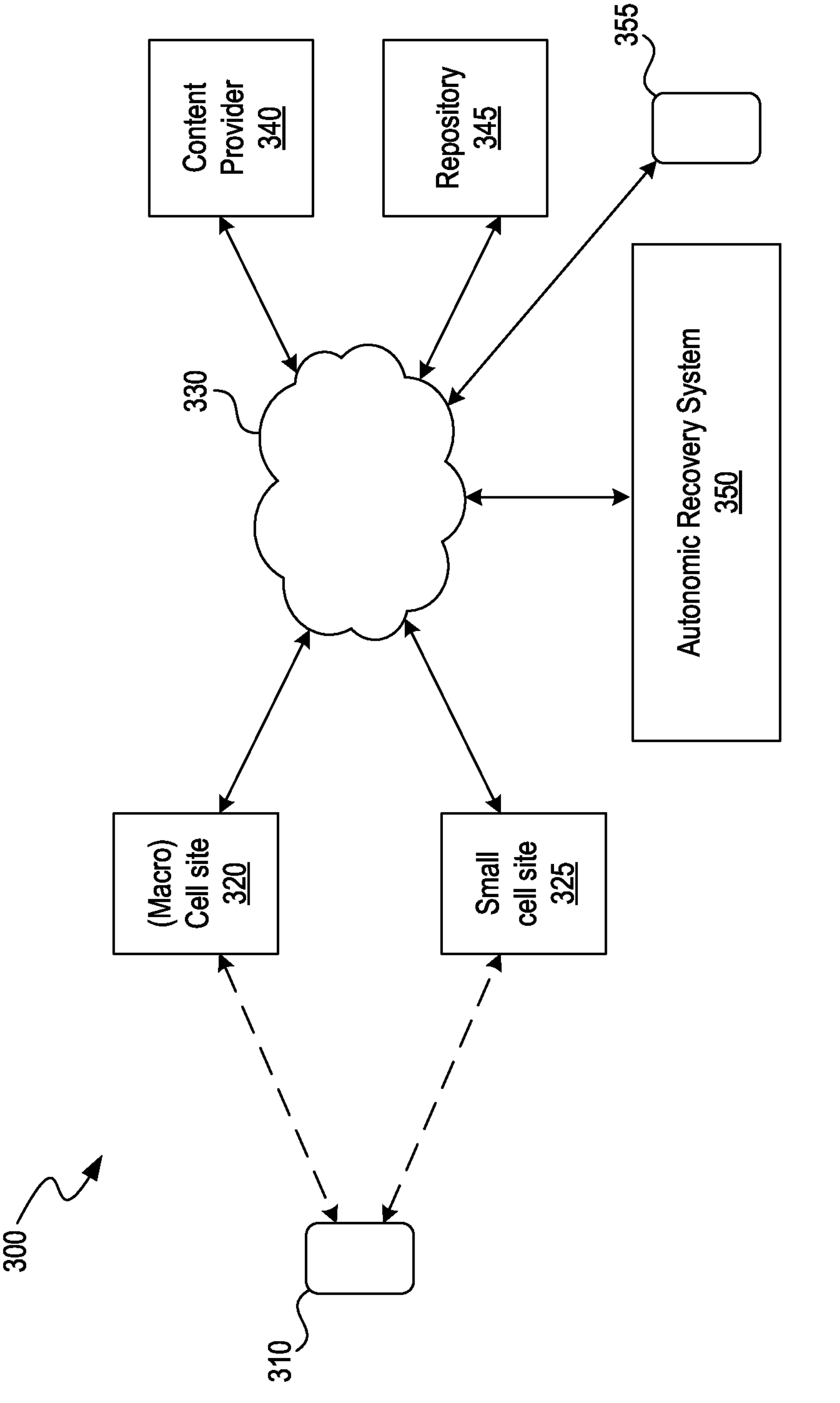
FIG. 3A is a block diagram illustrating a suitable computing environment within which to perform autonomic network recovery of devices using machine learning techniques, in accordance with one or more implementations.

FIG. 3A is a block diagram illustrating a suitable computing environment within which to perform autonomic network recovery of devices using machine learning techniques, in accordance with one or more implementations. As described herein, the computing environment 300 of FIG. 3A can be used to perform autonomic network recovery by identifying instructions for configuring a mobile device or a telecommunications network device, e.g., responsive to malfunctioning mobile devices. The system may use a trained machine learning model to identify potential instructions to transmit.

Computing environment 300 can include one or more user device(s) 310, one or more cell-sites 320 and 325, telecommunications network 330, content provider 340, cloud data repository 345, one or more other user devices 355, and autonomic recovery system 350.

User device(s) 310, such as mobile devices or user equipment (UE) associated with users (such as mobile phones (e.g., smartphones), tablet computers, laptops, and so on), Internet of Things (IoT) devices, vehicles (e.g., smart vehicles), devices with sensors, and so on, can be configured to receive and transmit data, stream content, and/or perform other communications or receive services over a telecommunications network 330, which is accessed by the user device 310 over one or more cell sites 320, 325. For example, the mobile device 310 accesses a telecommunication network 330 via a cell site at a geographical location that includes the cell site, in order to transmit and receive data (e.g., stream or upload multimedia content) from various entities, such as a content provider 340, repository 345, and/or other user devices 355 on the network 330 and via the cell site 320.

The cell sites can include macro cell sites 320, such as base stations, small cell sites 325, such as picocells, microcells, or femtocells, and/or other network access component or sites. The cell sites 320, 325 can store data associated with their operations, including data associated with the number and types of connected users, data associated with the provision and/or utilization of a spectrum, radio band, frequency channel, and so on, provided by the cell sites 320, 325, and so on. The cell sites 320, 325 can monitor their use, such as the provisioning or utilization of physical resource blocks (PRBs) provided by a cell site physical layer in LTE network or an NR cell site; likewise the cell sites can measure channel quality, such as via channel quality indicator (CQI) values, etc.

As described herein, the autonomic recovery system 350 can be used to autonomically recover connectivity of a mobile device, such as user device(s) 310, or proactively modify aspects of a service network to reduce the likelihood of connection failures. For example, the system may recover a connection responsive to an indication that a mobile device is not communicating properly, e.g., a message has not been received from the device in a threshold period of time and/or a message is uninterpretable by the service network. The system can identify instructions to autonomically recover connectivity by inputting data such as data from EDRs, device profiles, and/or KPIs associated with the device into a machine learning model configured to output one or more instructions for transmission to a remote device. Instructions can include, for example, commands to automatically configure the mobile devices or to modify a parameter of a user device and/or network node to facilitate improved communication between a mobile device and the network node.

As referred to herein, device profiles store information about the mobile devices used by subscribers. The device profile associated with each mobile device can include details such as the device's make and model, operating system, hardware specifications, software versions, and network capabilities (e.g., 4G/5G compatibility). The device profiles may also contain information about the device's usage patterns, such as data consumption, frequently used applications, and preferred services, and can be updated periodically by a mobile device or by a device associated with the service network as the mobile device is used. The information contained in a device profile can help ensure network compatibility, improve service delivery, and provide personalized customer support. Device profiles are described in further detail in relation with FIG. 4A.

As referred to herein, EDRs are records that capture granular information about network events and user interactions. EDRs can include data about call logs, data usage sessions, signal strength, location information, and network quality metrics during specific events, such as data sessions between a mobile device and a network node. EDRs can facilitate functions such as network troubleshooting, performance analysis, billing accuracy, and understanding user experience. EDRs are described in further detail in relation with FIG. 4B. According to some examples, the EDRs may further include data regarding control signaling received at the device/network node or transmitted to the device/network node to setup or modify any particular type of call or service, or to instruct the UE to perform certain tasks. In this way, the system may be enabled to identify past actions and whether or not they were successful. The system may also use metrics directly after a control signal is implemented to diagnose problems further.

As referred to herein, KPIs are metrics used to evaluate the performance and effectiveness of the network and services. KPIs can provide tangible benchmarks for various aspects of network operations, such as signal quality, call drop rates, data throughput, latency, and customer satisfaction. These indicators help network operators to monitor service quality, identify areas for improvement, and make informed decisions regarding network management and expansion. According to some examples, KPIs may also encompass metrics including revenue per user, churn rate, and service adoption rates. Regular monitoring and analysis of KPIs can enable telecom operators to maintain high standards of service, optimize network performance, and enhance customer experience. KPIs are described in further detail in relation with FIG. 4C.

The KPIs, device profiles and/or EDRs may be stored in one or more databases within the infrastructure of a telecommunications network provider. For example, such data may be store in repository 345. Although repository 345 is illustrated as a singular repository, it can be appreciated that more than one repository 345 can be used to perform the functions of a single repository 345, and that repository 345 can be representative of one or more repositories. Furthermore, although KPIs, device profiles, and/or EDRs are described herein, it can be appreciated that other records such as call detail records (CDRs) can be included in the one or more repositories.

Responsive to identifying an anomaly, such as not receiving a message (e.g., data packet) from a mobile device in a threshold period of time or determining that the message is uninterpretable, the system may access the data from the repository 345. For example, the system may not have received a message because the device was not sending a message, the device was sending a message but it was not able to be interpreted and/or wrong data, the data was corrupted during transmit, or the data was not able to be received at the system. The system may identify that the message has not been received in a variety of ways. In some examples, the system may monitor data packets through EDRs and identify the last data transmission from a specific mobile device occurred. Alternatively or additionally, the system may use the device profile and/or the network logs and timestamps to identify whether or not there were any recent updates or network interactions to indicate inactivity. Alternatively or additionally, the system may use heartbeat signals (e.g., small, automated messages sent at regular intervals by the device to indicate it is still connected) to identify if an anomaly has occurred. (e.g., if the heartbeat signals discontinue, the user may identify that the device is no longer connected).

Once the data is accessed by the system, the system may input the data into a machine learning model to identify one or more instructions for reconfiguring the mobile device, e.g., the user device(s) 310. For example, the instructions may be sent to the mobile device to initiate a software update at the mobile device. Alternatively or additionally, the instructions may be sent to other devices such as device(s) 355. The machine learning model can be trained, e.g., using data from repository 345 as well.

A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the machine learning model used by the system according to implementations herein can be a neural network with multiple input nodes that receive data associated with operation of mobile devices on a network, such as device profiles, EDR data, and/or KPI data. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer") one or more nodes can produce a value classifying the input that, once the model is trained, can be used to predict an appropriate modification to a mobile device or a network component. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

FIG. 3A and the discussion herein provide a brief, general description of a suitable computing environment 300 in which the autonomic recovery system 350 can be supported and implemented. Although not required, aspects of the autonomic recovery system 350 are described in the general context of computer-executable instructions, such as routines executed by a computer, e.g., mobile device, a server computer, or personal computer. The system can be practiced with other communications, data processing, or computer system configurations, including: Internet appliances, hand-held devices (including tablet computers and/or personal digital assistants (PDAs)), Internet of Things (IoT) devices, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In alternative implementations, the mobile device or portable device can represent the server portion, while the server can represent the client portion.

In some implementations, the user device 310 and/or the cell sites 320, 325 can include network communication components that enable the devices to communicate with remote servers or other portable electronic devices by transmitting and receiving wireless signals using a licensed, semi-licensed, or unlicensed spectrum over communications network, such as telecommunications network 330. In some cases, the telecommunications network 330 can be comprised of multiple networks, even multiple heterogeneous networks, such as one or more border networks, voice networks, broadband networks, service provider networks, Internet Service Provider (ISP) networks, Public Switched Telephone Networks (PSTNs), and/or satellite constellation networks interconnected via gateways operable to facilitate communications between and among the various networks. The telecommunications network 330 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), 6G, satellite constellation network or other communications networks. Thus, the user device is configured to operate and switch among multiple frequency bands for receiving and/or transmitting data.

Further details regarding the operation and implementation of the autonomic recovery system 350 will now be described.

Examples of Systems for Autonomic Network Recovery

Figure 3B:
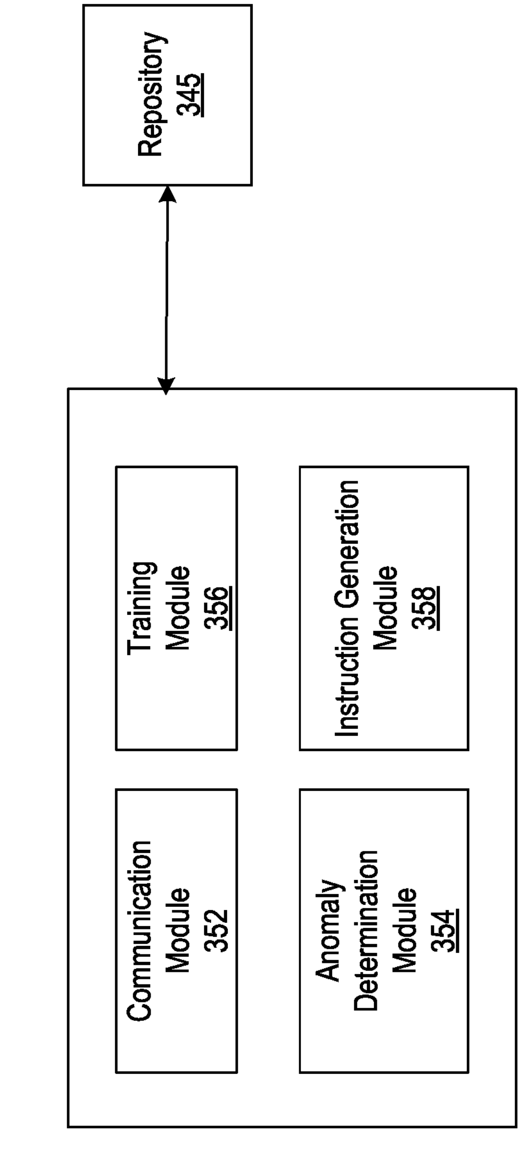
FIG. 3B is a block diagram illustrating the components of an exemplary system for autonomic network recovery of devices using machine learning techniques, in accordance with one or more implementations.

FIG. 3B is a block diagram illustrating the components of an exemplary system for autonomic network recovery of devices using machine learning techniques, in accordance with one or more implementations. Autonomic recovery system 350 can include functional modules that are implemented with a combination of software (e.g., executable instructions, or computer code) and hardware (e.g., at least a memory and processor). Accordingly, as used herein, in some examples a module is a processor-implemented module or set of code and represents a computing device having a processor that is at least temporarily configured and/or programmed by executable instructions stored in memory to perform one or more of the specific functions described herein. For example, the autonomic recovery system 350 includes a communication module 352, a anomaly detection module 354, training module 356, and an instruction generation module 358, each of which is discussed separately below.

Communication Module

Communication module 352 of autonomic recovery system 350 can include software and/or hardware components allowing for the transmission and/or receipt of information between two or more devices. Communication module 352 can include a wireless communication module, such as a cellular radio or Wi-Fi antenna, to allow for communication over wireless networks, and/or can additionally or alternatively include a network card (e.g., a wireless network card and/or a wired network card) that is associated with additional hardware and/or software to drive the card.

The communication module 352 is configured and/or programmed (e.g., via the above-mentioned techniques) to interface between a device (e.g., user device(s) 310, one or more other user devices 355), cell sites (e.g., cell sites 320, 325), content provider (e.g., content provider 340), cloud data repository (e.g., cloud data repository 345) such as via a network (e.g., network 330), to receive and transmit data including EDR data, KPI data, device profile data, and/or the like. When communication module 352 receives data, the module can pass on relevant portions of data to different modules of the autonomic recovery system 350. Communication module 352 can also be configured to transmit instructions for reconfiguring a mobile device and/or notifications and/or recommendations to operators.

When a mobile device is unable to communicate with the network, it is often difficult to rectify the problem because the mobile device is often unable to communicate the problem without operator assistance. For example, a mobile device may be unable to communicate with the network successfully in a variety of ways. In one example, the packets (e.g., messages) may not be interpretable because all or part of the packet got lost during transit, or may be uninterpretable because the device itself is corrupted and as such, unable to provide the correct information. Due to this, packets may not adhere to a predetermined message format protocol and as such may be uninterpretable. Alternatively or additionally, the mobile device may simply be unable to transmit any packets at all.

As such, the communication module 352 may receive, e.g., from the repository 345 via the network, one or more data structures (e.g., records, profiles) that can be used to identify when the mobile device is unable to communicate with the network in anomaly detection module 354. The communication module 352 can pass the data, or a pointer to the data in memory, to the anomaly detection module 354 for determining whether or not the mobile device is able to communicate with the network. Responsive to receiving an indication that a mobile device is unable to communicate with the network, the autonomic recovery system 350 may input device information into a machine learning model to identify instructions for reconfiguring the mobile device, e.g., in order to fix the communication between the mobile device and the network.

The communication module 352 can further supply data (e.g., from repository 345) for training a machine learning model to recover mobile devices, in some implementations. For example, the communication module 352 may access or otherwise obtain device profiles, EDR data, KPI data, etc. associated with a plurality of mobile devices as well as data indicative of modifications to a configuration for a corresponding mobile device responsive to anomalous events. For example, the communication module 352 may obtain information such as that for a device having IMEI “12345-678901-23456” when communication with the network was not detected in 4 hours, the operator looked at the specifications of the device and identified that the device was not updated to the most recent update, and the operator pushed an update to the device to fix the problem. The communication module 352 can pass the data, or a pointer to the data in memory, to the training module 356 for training. Once trained, the communication module 352 can also pass the data to insert in the trained model to obtain the instructions.

Anomaly Detection Module

According to some examples, the autonomic recovery system 350 may determine that a mobile device is unable to communicate with the network in a variety of ways. Anomaly detection module 354 may receive, e.g., via the communication module 352, one or more different types of information stored in records or other suitable data structures and determine, based on the information of those records, whether or not a mobile device is unable to communication with the network. For example, the system may obtain monitor data packets through EDRs and identify the last data transmission from a specific mobile device occurred. The communication module 352 can receive at least a part of one or more EDRs that can be used to identify the last data transmission of a specific mobile device. Alternatively or additionally, the communication module 352 may identify transmissions that are sent but corrupted mid-transmit, sent but incorrect (e.g., wrong format), and/or sent but not received at the network.

Figure 4B:
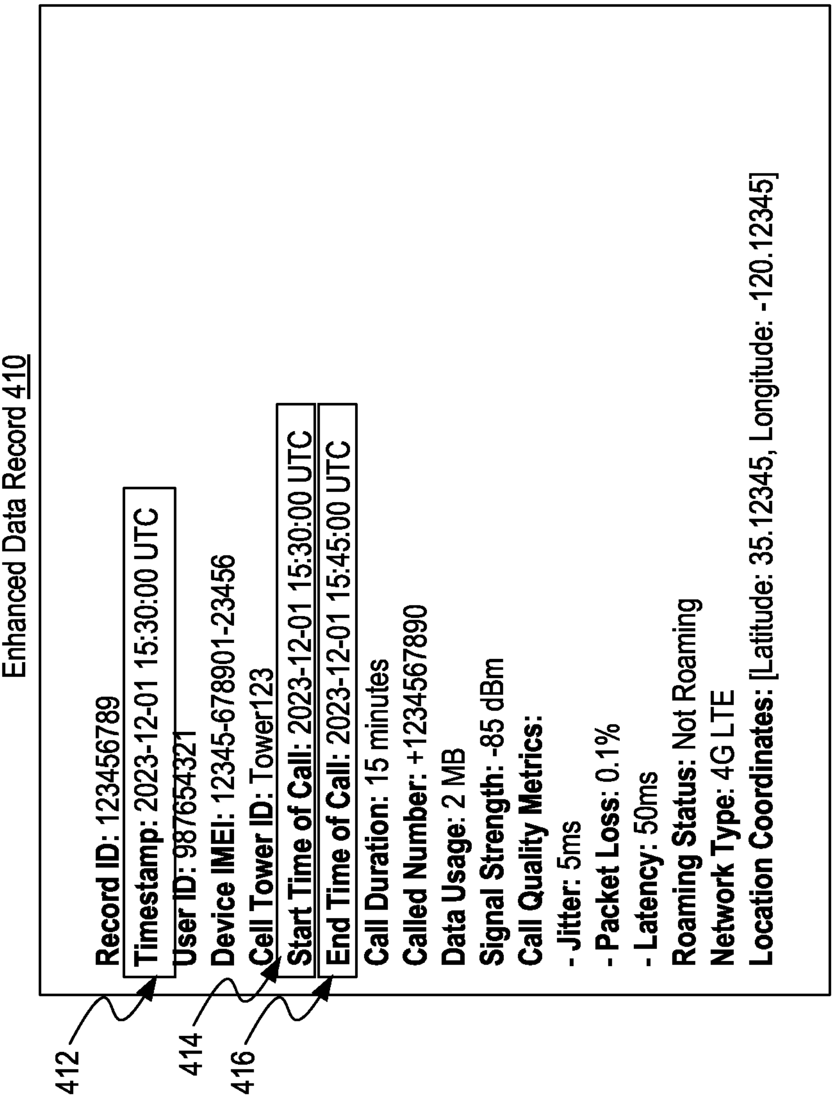
FIG. 4B is a block diagram illustrating an exemplary data structure of an enhanced device record, in accordance with one or more implementations.

FIG. 4B is a block diagram illustrating an exemplary data structure of an EDR 410, in accordance with one or more implementations. The system can receive one or more EDRs such as EDR 410 and identify based on the timestamp of the EDR 412, based on the start time 414 of an interaction (e.g., phone call) recorded by the EDR, and/or based on the end time 416 of an interaction recorded by the EDR, when the last interaction of the mobile device was. For example, for each device, the system may access (e.g., via database of repository 345 via network) all of the EDRs associated with the specific device (e.g., by parsing and/or looking up EDRs that include device-specific IMEI and/or user identifier) and identify the last EDR (e.g., the latest in time stamp) to determine the last time the device was successfully able to communicate with the network.

Alternatively or additionally, the autonomic recovery system 350 can determine that a mobile device is unable to communicate with the network using a device profile. In some examples, the device profile information can include user specific device information unique to individual devices and/or device type information specifying information regarding a device model, device manufacturer, standard software information, and/or average usage profiles. The communication module 352 can receive at least a part of one or more device profiles that can be used to identify the last data transmission of a specific mobile device.

FIG. 4A is a block diagram illustrating an exemplary data structure of a device profile 400, in accordance with one or more implementations. The system may determine the last successful communication with the network using one or more device profiles such as device profile 400 of FIG. 4A. In particular, the system may use the device profile and/or the network logs and timestamps to identify whether or not there were any recent updates or network interactions to indicate inactivity. For example, a recent update may be counted as a recent communication of the mobile device with the network. Alternatively or additionally, the system may use heartbeat signals to identify if an anomaly has occurred.

Responsive to determining that the service network has not received a packet from a mobile device in a threshold period of time and/or that packets received from the mobile device are not interpretable by the service network the indication, the anomaly detection module 354 may pass an indication of the same to the instruction generation module 358.

Instruction Generation Module

As described herein, responsive to an indication from the anomaly detection module 354 that the mobile device is not successfully communicating with the network, the instruction generation module may input information regarding the mobile device into the machine learning model to obtain an instruction for reconfiguring the mobile device e.g., in order to improve communication of the device with the network. The instruction generation module 358 may obtain information specific to the mobile device, such as device profile information of the mobile device and one or more EDRs indicative of events and transactions linked to the mobile device.

The instruction generation module 358 may input the device profile information and/or the EDRs into the machine learning model to identify an instruction for reconfiguring the mobile device. In some examples, the instruction generation module 358 may additionally or alternatively input KPIs, such as from KPI records (e.g., KPI record 420).

The instruction that is generated can include different types of instructions. In one example, the instruction is a command configured to automatically initiate a software update, adjust network settings, and/or notify or modify one or more device settings of the mobile device. Alternatively or additionally, the instruction can include a notification to a device manufacturer of the mobile device, such as to fix a common bug causing communication issues in specific devices. Alternatively or additionally the instruction can be an instruction to adjust parameters of a node in a telecommunications network (e.g., a base station or a cell tower) comprising one or more of an antenna tilt or orientation adjustment, power output adjustment, and/or hardware addition to increase capacity. In some embodiments, the instruction may include an instruction to shift or handover the device from one network to another, e.g., the network may be based on the output of the machine learning model(s). In this case, the network can automatically initiate the handover.

In some examples, if the network receives a new packet from the mobile device and the new packet is interpretable by the service network as a result of transmitting the instruction, the machine learning model may be updated based on the device profile information, the one or more EDRs, and the identified instruction. In particular, the training module 356 may be used to update the model.

In some examples, the machine learning model may output a confidence level for the identified instruction for reconfiguring the mobile device. In some cases, if the confidence level does not meet or exceed a predetermined threshold (e.g., as determined by an operator), the instruction generation module 358 may transmit a notification to an operator at a remote device via the communication module. For example, the notification can be a prompt to the operator to manually diagnose and suggest a solution. If communication can successfully be established between the network and mobile device as a result of the operator's solution, the device data and solution may be used to retrain the model.

Training Module

According to some implementations, the machine learning model used to identify instructions may be trained on the autonomic recovery system 350. In other implementations, the machine learning model may be trained on a different, remote device and the parameters of the machine learning model may be transmitted and stored for execution on the autonomic recovery system 350.

As described herein, in order to train the machine learning model, the training module may first obtain (e.g., from repository 345) data on which to train the model on, such as via communication module 352. For example, the communication module 352 may access or otherwise obtain device profiles, EDR data, KPI data, etc. associated with a plurality of mobile devices as well as data indicative of modifications to a configuration for a corresponding mobile device responsive to anomalous events. The communication module 352 can pass the data, or a pointer to the data in memory, to the training module 356 for training.

The training module 356 trains the machine learning model using a set of training data received at or generated by the training module 356. Training data can include a set of device profiles, EDR data, and/or KPI data associated with mobile devices that have operated in a network. The training datasets can be labeled according to an anomaly detected in associated with the data or an action taken to address an anomaly, as well as an outcome of the action (e.g., whether the anomaly persisted after implementation of the action). Training data can additionally or alternatively include synthetic data. Based on the training data, the training module 356 can use supervised learning, reinforcement learning, or other learning techniques to train a model that maps device profiles, EDR data, and KPI data to modifications that, when implemented on a mobile device or on telecommunications network equipment, proactively or reactively address anomalies in a mobile device's communication with the network. For example, a representation of device profiles, EDR data, and/or KPI data, as well as a corresponding modification, can be provided to the model. Output from the model (e.g., a predicted modification) can be compared to the desired output for the mobile device given the inputs. Based on the comparison, the model can be modified, such as by changing weights between nodes of the neural network or parameters of the functions used at each node in the neural network (e.g., applying a loss function). After applying each data item in the training datasets and modifying the model in this manner, the model can be trained to evaluate new device profiles, EDR data, and KPI data in order to determine an appropriate modification to mitigate an anomaly.

Once the model is trained based on the received data, the system may store the parameters of the trained model and execute the model when needed. The training module 356 can periodically update the model based on operation of mobile devices observed over time. For example, if an action is taken to mitigate an anomaly associated with a mobile device, a data record can be generated based on the action taken, an outcome of the action (e.g., persistence or mitigation of the anomaly), and a device profile, EDR data, or KPI data associated with the mobile device. The training module 356 can retrain the model using the data record. For example, the training module 356 triggers retraining of the model when it is detected that an anomaly persists even after an action has been taken to address the anomaly.

For example, the model may be retrained, e.g., in periodic intervals such as determined by an operator or triggered by an operator. The model may be retrained using data from a more recent period of time using data described herein and information regarding whether the communication error has been resolved. In particular, the model may learn over time that the anomaly, e.g., communication error is not resolved using certain instructions based on feedback (e.g., KPIs after the instructions were generated and transmitted).

Flow Diagram

Figure 5:
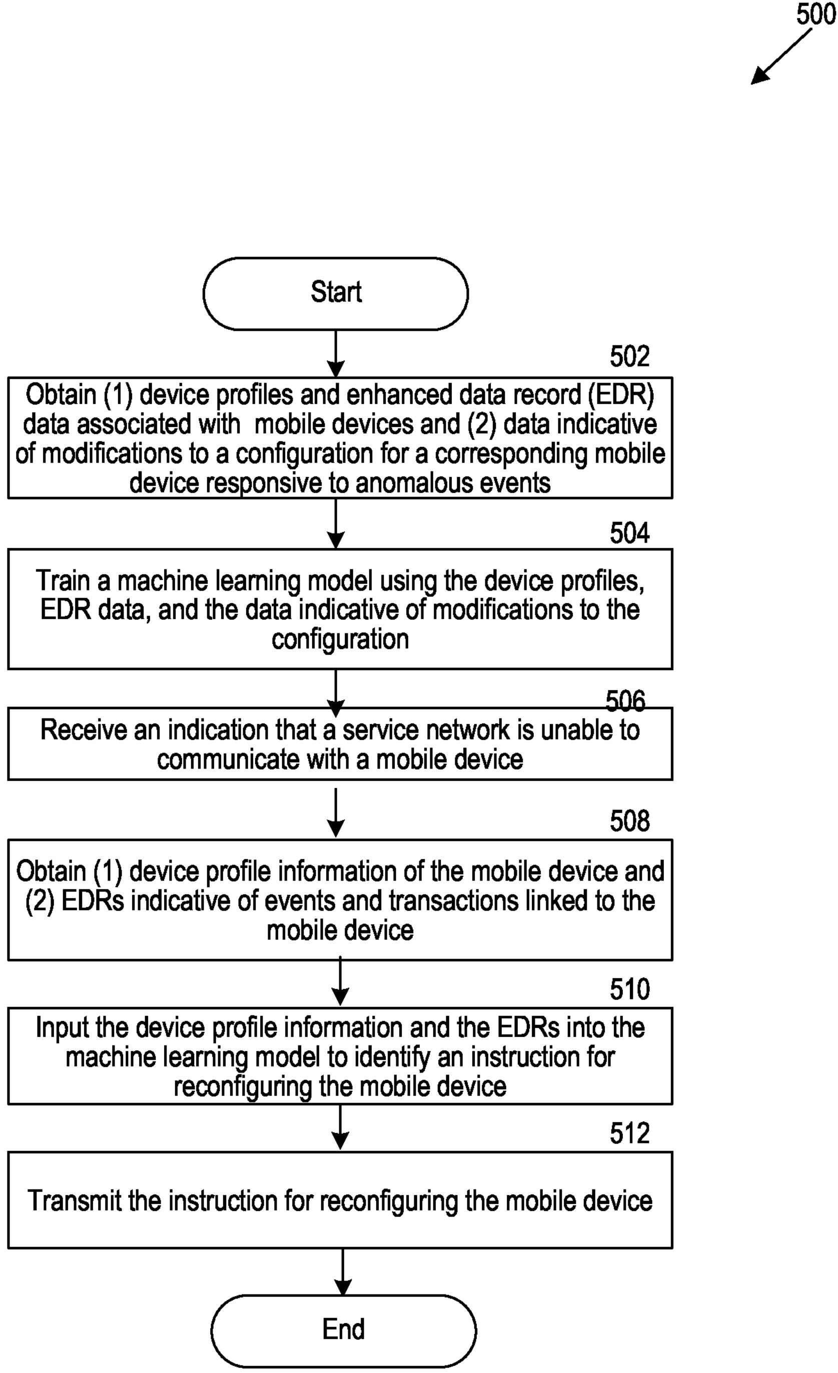
FIG. 5 is a flow diagram illustrating a process for autonomic network recovery of devices using machine learning techniques, in accordance with one or more implementations.

FIG. 5 is a flow diagram illustrating a process for autonomic network recovery of devices using machine learning techniques, in accordance with one or more implementations. Process 500 begins at block 502 where a system (e.g., such as autonomic recovery system 350) obtains (1) device profiles and enhanced data record (EDR) data associated with mobile devices and (2) data indicative of modifications to a configuration for a corresponding mobile device responsive to anomalous events (as discussed above in reference to the communication module 352). At block 504, process 500 includes training a machine learning model using the device profiles, EDR data, and the data indicative of modifications to the configuration (as discussed above in reference to the training module 356). Process 500 then proceeds to block 506 where a system receives an indication that a service network is unable to communicate with a mobile device.

At block 508, process 500 obtains (1) device profile information of the mobile device and (2) EDRs indicative of events and transactions linked to the mobile device. The process proceeds to block 510, where the device profile information and the EDRs are input into the machine learning model to identify an instruction for reconfiguring the mobile device. At block 512, the system can transmit the instruction for reconfiguring the mobile device.

Computer System

Figure 6:
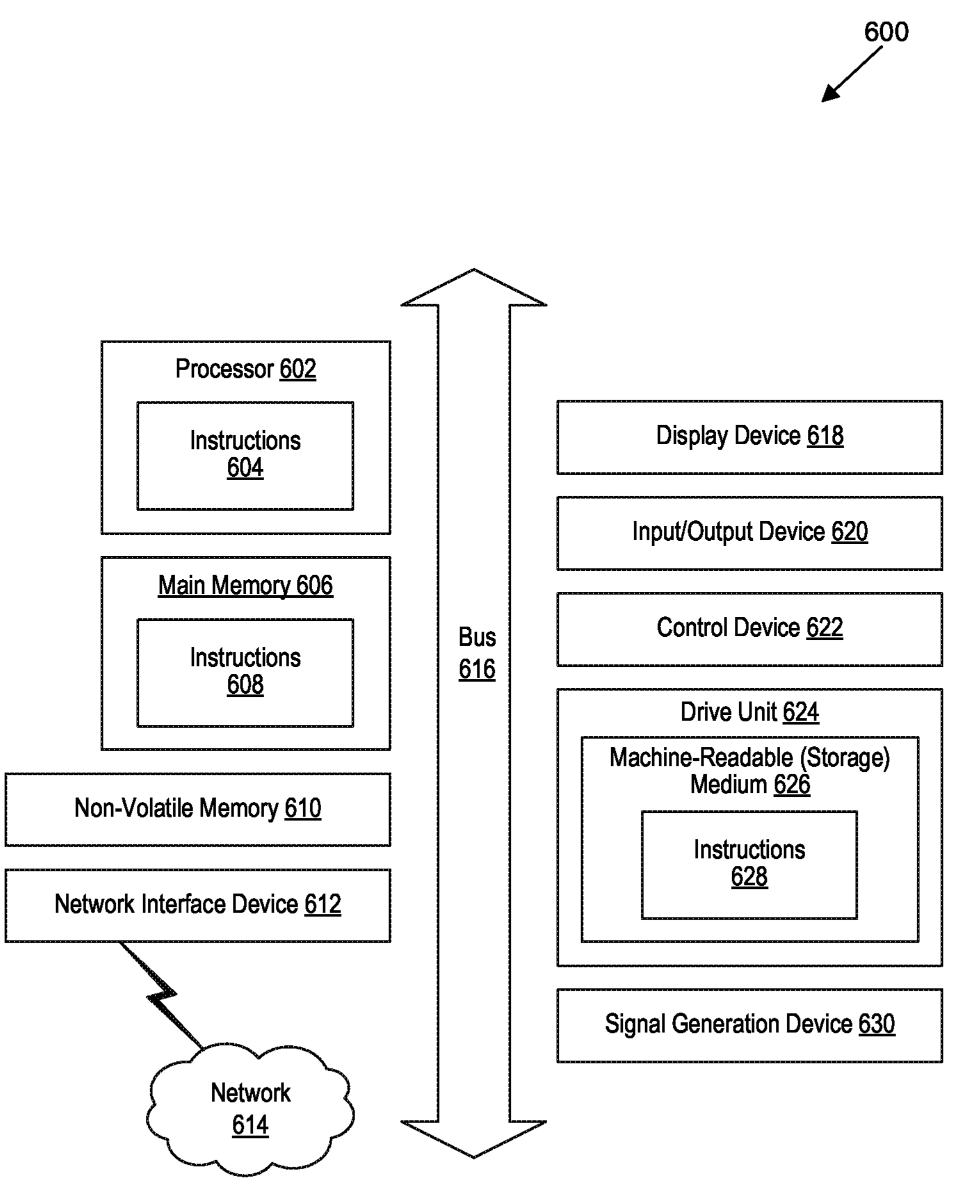
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 shares a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number can also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that can be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A method for autonomic network recovery of mobile devices, comprising:

obtaining, (1) device profiles and enhanced data record (EDR) data associated with each of a plurality of mobile devices in a telecommunications network and (2) for one or more of the plurality of mobile devices, data indicative of a modification to a configuration for a corresponding mobile device responsive to an anomalous event;

training a machine learning model using the device profiles, EDR data, and the data indicative of modifications to the configuration, wherein the machine learning model is trained to produce recommended modifications to a device configuration based on device profiles and EDR data;

receiving an indication that a service network of the telecommunications network:

has not received a packet from a target mobile device in a threshold period of time, or one or more packets received from the target mobile device are not interpretable by the service network;

responsive to receiving the indication, obtaining (1) device profile information of the target mobile device from a database, wherein the device profile information comprises device model data, software version data, or usage pattern data and (2) one or more EDRs generated by a network comprising data indicative of events and transactions linked to the target mobile device;

processing the device profile information and the one or more EDRs using the machine learning model to generate an instruction for reconfiguring the target mobile device; and transmitting the instruction to a remote device for reconfiguring the target mobile device.

2. The method of claim 1, wherein the remote device comprises the target mobile device and wherein the instruction is a command configured to automatically initiate a software update, adjust network settings, or notify a user to modify one or more device settings of the target mobile device.

3. The method of claim 1, further comprising:

after transmitting the instruction to the remote device, determining a new packet received from the target mobile device is interpretable by the service network; and updating the machine learning model using the device profile information of the target mobile device, the one or more EDRs linked to the target mobile device, and the instruction.

4. The method of claim 1, wherein the device profile information comprises:

(a) user specific device information unique to individual devices, or (b) device type information specifying information regarding a device model, device manufacturer, standard software information, or average usage profiles.

5. The method of claim 1, wherein the instruction to a remote device comprises a notification to a device manufacturer of the target mobile device.

6. The method of claim 1, wherein the instruction is an instruction to adjust parameters of a telecommunications network node comprising one or more of an antenna tilt or orientation adjustment, power output adjustment, or hardware addition to increase capacity.

7. The method of claim 1, wherein the indication that packets received by the service network are not interpretable is based on a determination that one or more packets do not adhere to a predetermined message format protocol.

8. The method of claim 1, further comprising responsive to an indication that a confidence level for the instruction for reconfiguring the target mobile device does not meet or exceed a predetermined threshold, transmitting a notification to an operator at a remote device.

9. A non-transitory computer-readable medium containing instructions configured to cause one or more processors to perform a method for autonomic network recovery of mobile device, the method comprising:

receiving an indication that a service network of a telecommunications network:

has not received a packet from a target mobile device in a threshold period of time, or one or more packets received from the target mobile device are not interpretable by the service network;

responsive to receiving the indication, obtaining (1) device profile information of the target mobile device from a database, wherein the device profile information comprises device model data, software version data, or usage pattern data and (2) one or more EDRs generated by a network comprising data indicative of events and transactions linked to the target mobile device;

processing the device profile information and the one or more EDRs using a machine learning model to generate an instruction for reconfiguring the target mobile device; and transmitting the instruction to a remote device for reconfiguring the target mobile device.

10. The non-transitory computer-readable medium of claim 9, wherein the instructions further cause operations including:

obtaining, (1) device profiles and enhanced data record (EDR) data associated with each of a plurality of mobile devices in the telecommunications network and (2) for one or more of the plurality of mobile devices, data indicative of a modification to a configuration for a corresponding mobile device responsive to an anomalous event; and training the machine learning model using the device profiles, EDR data, and the data indicative of modifications to the configuration, wherein the machine learning model is trained to produce recommended modifications to a device configuration based on device profiles and EDR data.

11. The non-transitory computer-readable medium of claim 9, wherein the remote device comprises the mobile device and wherein the instruction is a command configured to automatically initiate a software update, adjust network settings, and/or notify a user to modify one or more device settings of the mobile device.

12. The non-transitory computer-readable medium of claim 9, wherein the instructions further cause operations including:

receiving a new packet from the mobile device, wherein the new packet is interpretable by the service network; and updating the machine learning model using the device profile information, the one or more EDRs, and the instruction.

13. The non-transitory computer-readable medium of claim 9, wherein the device profile information comprises (a) user specific device information unique to individual devices and/or (b) device type information specifying information regarding a device model, device manufacturer, standard software information, and/or average usage profiles.

14. The non-transitory computer-readable medium of claim 9, wherein the indication that packets received by the service network are not interpretable is based on a determination that one or more packets do not adhere to a predetermined message format protocol.

15. The non-transitory computer-readable medium of claim 9, wherein the instruction to a remote device comprises a notification to a device manufacturer of the mobile device.

16. A system for autonomic network recovery of mobile devices, the system comprising:

one or more processors; and one or more non-transitory, computer-readable media comprising instructions that, when executed by the one or more processors, causes operations comprising:

receiving an indication that a service network of a telecommunications network:

has not received a packet from a target mobile device in a threshold period of time, or one or more packets received from the target mobile device are not interpretable by the service network;

responsive to receiving the indication, obtaining (1) device profile information of the target mobile device from a database, wherein the device profile information comprises device model data, software version data, or usage pattern data and (2) one or more EDRs generated by a network comprising data indicative of events and transactions linked to the target mobile device;

processing the device profile information and the one or more EDRs using a machine learning model to generate an instruction for reconfiguring the target mobile device; and transmitting the instruction to a remote device for reconfiguring the target mobile device.

17. The system of claim 16, wherein the instructions further cause operations including:

obtaining, (1) device profiles and enhanced data record (EDR) data associated with each of a plurality of mobile devices in the telecommunications network and (2) for one or more of the plurality of mobile devices, data indicative of a modification to a configuration for a corresponding mobile device responsive to an anomalous event; and training the machine learning model using the device profiles, EDR data, and the data indicative of modifications to the configuration, wherein the machine learning model is trained to produce recommended modifications to a device configuration based on device profiles and EDR data.

18. The system of claim 16, wherein the remote device comprises the target mobile device and wherein the instruction is a command configured to automatically initiate a software update, adjust network settings, and/or notify a user to modify one or more device settings of the mobile device.

19. The system of claim 16, wherein the instructions further cause operations including:

receiving a new packet from the target mobile device, wherein the new packet is interpretable by the service network; and updating the machine learning model using the device profile information, the one or more EDRs, and the instruction.

20. The system of claim 16, wherein the device profile information comprises (a) user specific device information unique to individual devices and/or (b) device type information specifying information regarding a device model, device manufacturer, standard software information, and/or average usage profiles.

* * * * *